No. 788,778. Patented May 2, 1905.

UNITED STATES PATENT OFFICE.

CARLO LAMARGESE, OF ROME, ITALY.

PROCESS OF CASE-HARDENING.

SPECIFICATION forming part of Letters Patent No. 788,778, dated May 2, 1905.

Application filed November 10, 1903. Serial No. 180,575.

*To all whom it may concern:*

Be it known that I, CARLO LAMARGESE, a subject of the King of Italy, and a resident of Rome, Italy, have invented certain new and useful Improvements in Processes of Case-Hardening, (for which I have applied for Letters Patent in Italy on August 8, 1903,) of which the following is a specification.

In my application for United States patent filed March 19, 1903, I have disclosed a process for case-hardening iron and steel with charcoal obtained from the carbonization of the bark of wild pine or other equivalent resinous wood. I have now found that by adding to the said charcoal a suitable quantity of silicon compound, preferably silica, I can obtain greater hardness and effect the cementation in less time, as the silica in contact with the charcoal when raised to a high temperature combines with the iron or steel with which it is in contact and forms a carbureted silicate of iron, which greatly improves and hastens the process of cementation.

In order that my said invention may be more clearly understood, I will proceed to describe step by step how I proceed for putting same in operation.

I add to the charcoal obtained by the carbonization of the bark of wild pine or other resinous wood or to a mixture of seventy or seventy-five parts of charcoal twenty-five to thirty per cent., in weight, of pure fine silica and mix the same intimately, thus obtaining the mixture ready to be used for case-hardening. Then in order to cement an armor-plate or other object I proceed in the same way as is now practiced for case-hardening armor-plates, only that I reduce very considerably the thickness of the layers of charcoal on the face to be cemented and of the sand on the face to be protected. In this way I can bring the plate to be cemented to the required temperature in much less time than with any other process now in use, for I can reach the cementation temperature in two or three days, and the cementation is then effected to a depth of one-half to three-fourths of an inch in two to four days.

With my process I can use a much thinner layer of sand and of charcoal, because a smaller quantity of my mixture of charcoal of bark of wild pine and sand effects the cementation in a much shorter time than ordinary charcoal or other mixtures so far used, and the plate must thus be kept in the furnace for a short period of time, so that there is no danger of the plate being damaged by the fire.

I have found that I obtain the best results with a mixture of about seventy to seventy-five parts, in weight, of charcoal of pine of the bark of wild pine and twenty-five to thirty parts, in weight, of finely-powdered pure silica; but these proportions may obviously be varied without departing from the gist of my invention.

Having now fully described my said invention and the manner in which the same is operated, I declare that what I claim as my invention, and desire to secure by Letters Patent, is—

1. A process of case-hardening iron or steel which consists in heating the article in contact with a mixture of charcoal obtained by carbonizing the bark of wild pine and pure powdered silicon compound.

2. A process of case-hardening iron or steel which consists in heating the article in contact with a mixture of silica and charcoal obtained by carbonizing resinous woods.

In witness whereof I have hereunto set my hand in the presence of two witnesses.

CARLO LAMARGESE.

Witnesses:
G. B. ZAMARDO,
A. RIGGS.